Dec. 18, 1928.  1,695,954
L. A. FRAYER
CLUTCH MECHANISM FOR BAR MACHINES
Filed March 23, 1925
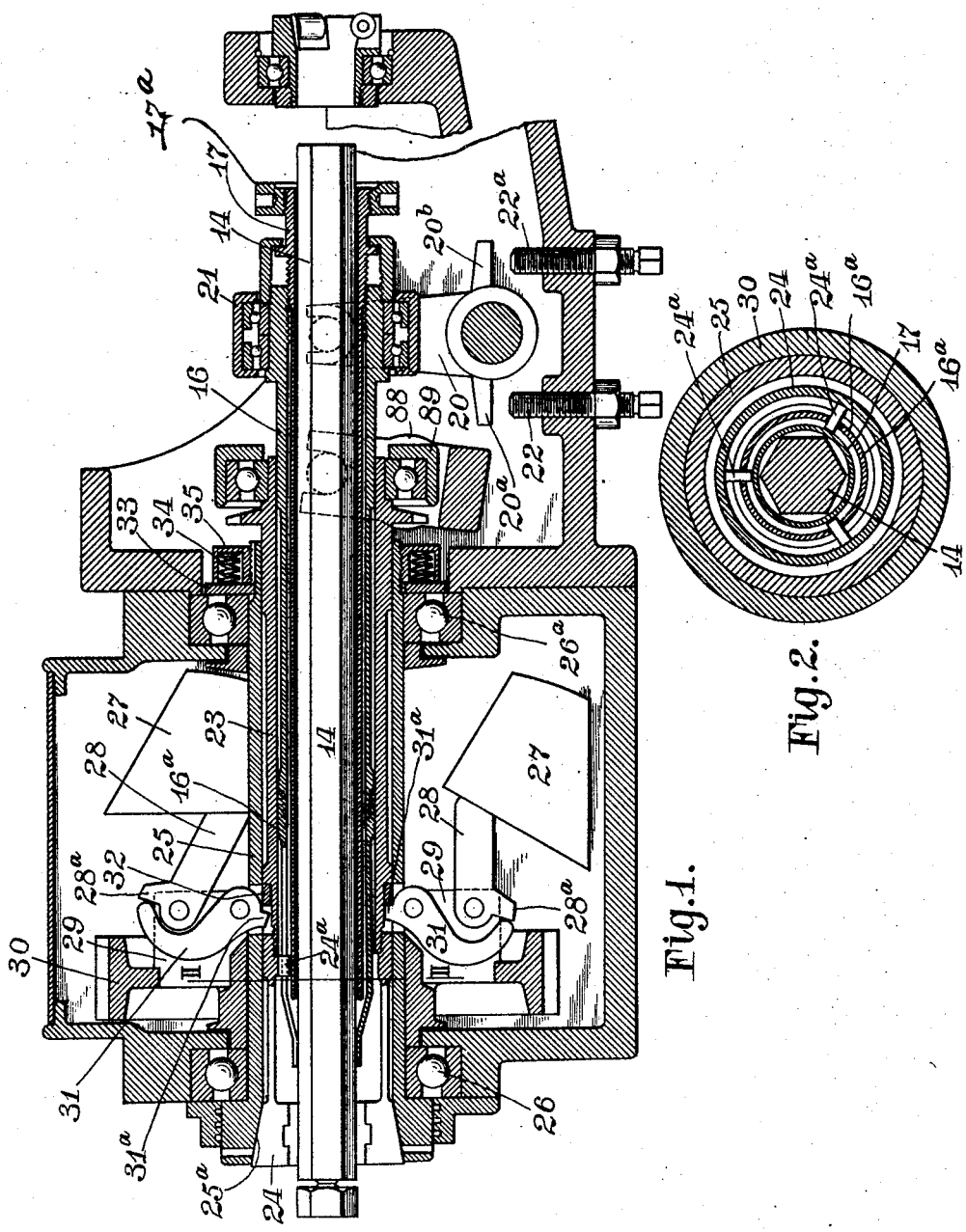
Inventor
LEE A. FRAYER Patented Dec. 18, 1928.

1,695,954

UNITED STATES PATENT OFFICE.

LEE A. FRAYER, OF COLUMBUS, OHIO.

CLUTCH MECHANISM FOR BAR MACHINES.

Application filed March 23, 1925. Serial No. 17,569.

The invention relates more particularly to the type of machine shown and described in Letters Patent of the United States issued to me April 31, 1925, No. 1,531,280, in which the nut blank or other device is drilled and cut from a bar of fed and rotated stock; and the invention has for its object the provision of an improved centrifugal chuck means for holding the stock, and means cooperating therewith for feeding the stock and holding it from rotation in respect of the feeding means. It also includes improved means for releasing the bar feeding means from the bar. Other objects can be gathered from the disclosure herein.

The invention is embodied in the example herein shown and described the features of novelty being finally claimed.

In the accompanying drawing—

Figure 1 is a central longitudinal sectional view illustrating the improvement as applied with a part broken out, and Fig. 2 is a cross section on the line II—II Fig. 1.

In the views the character 16 designates the feed tube for the stock bar (shown at 14) said tube having threaded to it at its forward end a removable section $16^a$ slit to form bent spring fingers for frictionally engaging the faces of the stock bar with sufficient firmness to feed the bar forward when the tube is moved in that direction. The section $16^a$ is made removable so that another section of different size can be substituted for it. Screw threaded into the feed tube at its rear end is a release tube 17 of sufficient length to permit it by turning the wheel $17^a$ with a suitable wrench or pin to be advanced under the spring fingers of the section $16^a$ to lift them from the stock bar. The threading of the release tube should be made ample to lift the spring fingers sufficiently to permit easy movement or removal of the stock bar or remnant thereof when desired. The feed tube together with the release tube are both rotated and reciprocated the latter being effected by means including a fork lever 20 straddling the feed tube and having its fork arm further forked to engage opposite trunnions on a yoke ring 21 seated in an annular groove in the rear end of the feed tube. The ring 21 permits the feed tube to be rotated for turning the bar in the cutting operation. The fork lever 20 is oscillated to feed the stock bar by suitable means such as shown in my said former application for patent and the extent of the oscillation and feed of the bar is regulated by two adjustable set screws 22 and $22^a$ against the ends of which lateral lugs $20^a$ and $20^b$ of the fork lever collar abut to limit the oscillation of said fork lever.

The character 23 designates the chuck sleeve which has connected with its forward end an externally flared collet 24, the jaws of which are compressible against the bar stock when the sleeve is moved rearwardly and the collet drawn into the correspondingly flared cavity $25^a$ of the forward end of the work spindle 25. In the present instance the collet 24 is provided with inwardly projecting lugs $24^a$ that extend between the bar gripping spring fingers of the movable section $16^a$ and insure the rotation of the feed and release tubes with the chuck sleeve 23. The work spindle, chuck sleeve and jaws, feed and release tubes are all rotatable in suitable bearings at 26 and $26^a$ by power applied to a large spur gear 30.

To automatically move and hold the chuck sleeve and jaws axially with reference to the work spindle and for the purpose of compressing the chuck jaws to grip the stock bar I employ centrifugal elements including weights 27 having arms 28 provided with lugs $28^a$ said arms being pivoted on walls 29 extending from the large gear 30.

Pivoted on the walls 29 are levers 31 having short lugs $31^a$ and curved outer portions within which work the ends of the arms 28 so that the moment the weights 27 move outward under centrifugal action or gravity the lugs $28^a$ press said levers 31 in that direction which causes the lugs $31^a$ to move the chuck sleeve in the direction to close the chuck jaws on the stock bar. At the point where the lugs $31^a$ actuate the chuck sleeve the latter is provided with a bearing ring of hard metal 32. The arms 28 are unconnected with the levers 31 so that gravity affects the weight on the lower centrifugal element and increases the chucking pressure, and the effect of gravity above the center does not have any diminishing or offsetting effect on the chucking force.

The work spindle has feathered on it a bearing ring 33 pressed by springs 34 carried in a hollow or socketed ring 35 adjustably threaded on the rear end of the chuck sleeve 25, so that the pressure of the ring can be regulated to compensate for expansion and contraction or take up wear.

The chuck collet 24 is released from the stock bar and against the pressure of the centrifugal weight by suitable power actuating a pivoted yoke 88 engaging opposite trunnions on a ring 89, these parts being connected with the rear end of the chuck sleeve and said sleeve turning in said ring substantially as in my former patent referred to. When the chuck collet is thus released the forked lever 20 is actuated to feed the stock bar forward the distance required to permit the cutting from the stock bar a nut blank or other portion of the required length or thickness.

The forms of the parts can be changed without departing from the gist of the invention as claimed.

What I claim is:

1. In a bar feeding machine, the combination, of bar feeding means, a chuck tube and chuck and rotating means therefor, a lever pivoted with the rotating means and engaging the chucking member and a centrifugal element to act on said lever to cause the chucking of the fed bar, said centrifugal element being movable independently of said lever.

2. In a bar feeding machine, the combination, of bar feeding means, a chuck tube and chuck tube and chuck and rotating means therefor, a lever pivoted with the rotating means and engaging the chucking member and a centrifugal element to act on said lever to chuck the fed bar, said centrifugal element being movable independently of said lever and means for releasing said chucking means notwithstanding the operation of the centrifugal element.

3. In a bar feeding mechanism, the combination of bar chucking means, bar feeding means including a feed tube movable longitudinally with reference to the chucking means, said feed tube carrying spring fingers to engage the bar and means whereby said spring fingers may be released from the bar at will, and means connecting the chucking means with the feed tube to cause the latter to rotate with the chucking means.

4. In a bar feeding machine, the combination, of a rotary bar chucking means, bar feeding means including a feed tube and a feed tube releasing tube movable longitudinally with reference to each other and to the chucking means, and means connecting the chucking means with the fed tube to cause the latter to rotate with the chucking means.

5. In a bar feeding machine, the combination, of a longitudinally movable and rotatable bar chucking means, bar feeding means including a feed tube and a feed tube releasing means movable longitudinally with reference to each other and to the chucking means, means connecting the chucking means with the feed tube to cause the latter to rotate with the chucking means, and means for operating the chucking and feeding means independently of each other.

6. In a bar feeding machine, the combination of bar chucking means and bar feeding means, the latter consisting of a tube having spring fingers for engaging the bar, and releasing means for said fingers consisting of a tube longitudinally movable with reference to said bar feeding means.

7. In a bar feeding machine the combination of bar chucking means and bar feeding means, the latter consisting of a tube having spring fingers for engaging the bar, and releasing means for said fingers consisting of a tube longitudinally movable with reference to said bar feeding means and lugs on the chucking means engaging said spring fingers to cause the feeding and releasing means to rotate with the chucking means.

8. In a bar feeding machine the combination of bar chucking means and bar feeding means, the latter consisting of a tube having spring fingers for engaging the bar, and releasing means for said fingers consisting of a tube connected with the bar feeding means and longitudinally movable with reference to said bar feeding means.

LEE A. FRAYER.